A. A. & L. A. NASH.
CULTIVATOR.
APPLICATION FILED MAR. 9, 1912.

1,081,767.

Patented Dec. 16, 1913.
2 SHEETS—SHEET 2.

WITNESSES
E. C. Duffy
A. C. Heap.

INVENTORS
Albert A. Nash & Lewis A. Nash
by C. P. Barnes
their Attorney

UNITED STATES PATENT OFFICE.

ALBERT A. NASH AND LEWIS A. NASH, OF THURSTON, NEBRASKA.

CULTIVATOR.

1,081,767. Specification of Letters Patent. Patented Dec. 16, 1913.

Application filed March 9, 1912. Serial No. 682,566.

*To all whom it may concern:*

Be it known that we, ALBERT A. NASH and LEWIS A. NASH, citizens of the United States of America, residing at Thurston, in the county of Thurston and State of Nebraska, have invented certain new and useful Improvements in Cultivators, of which the following is a specification.

This invention relates to cultivators, and one of the principal objects of the same is to provide a straddle row cultivator in which improved means are provided for rendering the cultivator shovels or disks adjustable and to permit the same to be moved by the feet of the driver in any direction.

Another object of the invention is to provide improved means for steering and controlling the movements of the shovels or disks.

Figure 1:
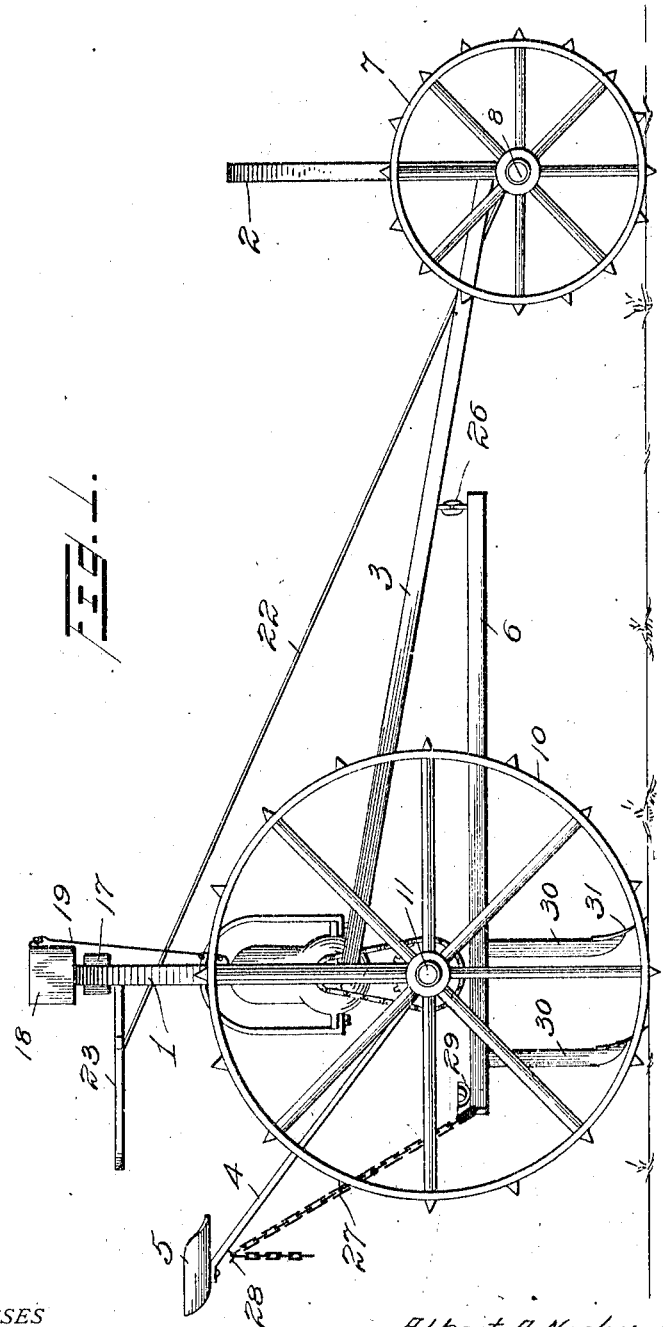
Figure 2:
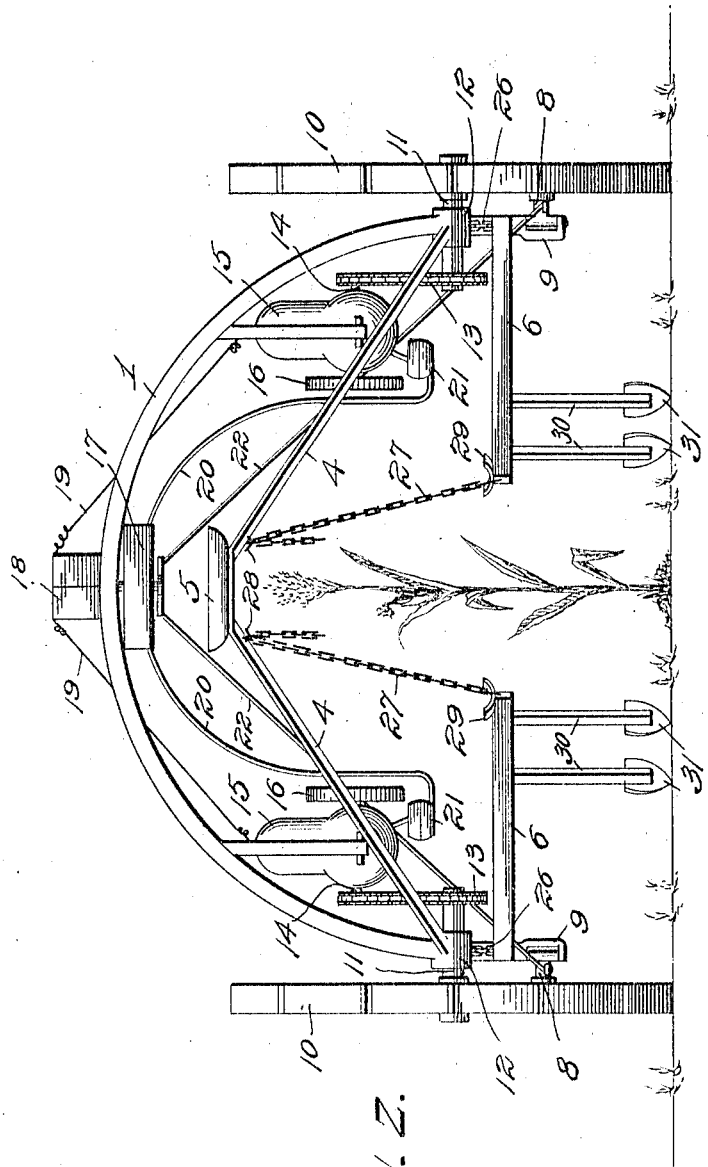

These and other objects may be attained by means of the construction illustrated in the accompanying drawings, in which:

Figure 1 is a side elevation of a straddle row cultivator made in accordance with our invention; Fig. 2 is a rear elevation of the cultivator.

Referring to the drawings for a more particular description of the invention, the numeral 1 designates the rear arch; 2 is the front arch; 3 are the side bars of the frame; 4 are the seat supports; 5 is the seat; and 6 are the cultivator beams. The front wheels 7 are mounted on stub axles 8 pivotally mounted in yokes 9 formed on the lower ends of the front arch 2. The rear wheels 10 are the drive wheels and they are mounted upon stub axles 11 journaled in bearings 12 formed upon the lower ends of the rear arch 1. Connected to the inner ends of the stub axles 11 are sprocket wheels around which the drive chains 13 pass, said chains extending around a sprocket wheel on a crank shaft 14 operated by a piston within the motor casing 15. Fly wheels 16 are mounted on the inner ends of the shaft 14. A gasolene tank 17 is supported under the arch 1 and batteries 18 are supported upon the arch 1. Connecting wires 19 extend from the batteries 18 to the motors 15. Fuel supply pipes 20 extend from the tank 17 to the carbureters 21 and from thence to the cylinders of the motors 15.

Steering rods 22 lead from the front axles 8 to a lever 23, one of said rods being secured to a projecting arm 24 on one side of said lever and the other rod 22 extending to another arm 25 extending from the opposite side of said lever 23, and said arms being out of alinement.

The cultivator beams 6 are suspended from their front ends upon chains 26 connected to the side bars 3 of the frame near the longitudinal centers of said side bars, while the rear ends of said beams 6 are suspended from chains 27, adjustably connected to hooks 28 attached to the seat supporting bars 4. By suspending the front ends of the beams near the longitudinal centers of the side bars of the frame the desired inclination is given to the beams and at the same time the beams are shortened, thus giving greater efficiency to the construction. On the rear ends of the beams 6 stirrups or foot rests 29 are provided. Connected to the beams 6 are standards 30 to which the shovels 31 are secured.

The operation of our invention may be briefly described as follows: The driver sitting upon the seat 5 places his feet upon the stirrups 29; with his hand upon the steering lever 23, the machine is started, the driver moving the beams 6 to control the action of the shovels or disks of the cultivator.

From the foregoing, it will be obvious that our cultivator may be successfully operated by a single person and that it is simple in construction and easily managed.

We claim:

A straddle row cultivator comprising front and rear arches connected together by inclined longitudinal frame bars, wheels journaled to said arches, cultivator beams pivotally connected at their front ends near the longitudinal centers of the frame bars to give the required inclinations to the beams, a driver's seat mounted on the frame, chains connected to said beams at their rear ends, hooks on the seat frame for engaging links of said chains to provide vertical adjustment of the beams, and cultivator shovels connected to said beams.

In testimony whereof we affix our signatures in presence of two witnesses.

ALBERT A. NASH.
LEWIS A. NASH.

Witnesses:
PAUL RIEDLER.
CLARENCE R. WOODBURY.